E. C. SEAMAN.
Ice Cream Freezer.
No. 5,821. Patented Oct. 3, 1848.
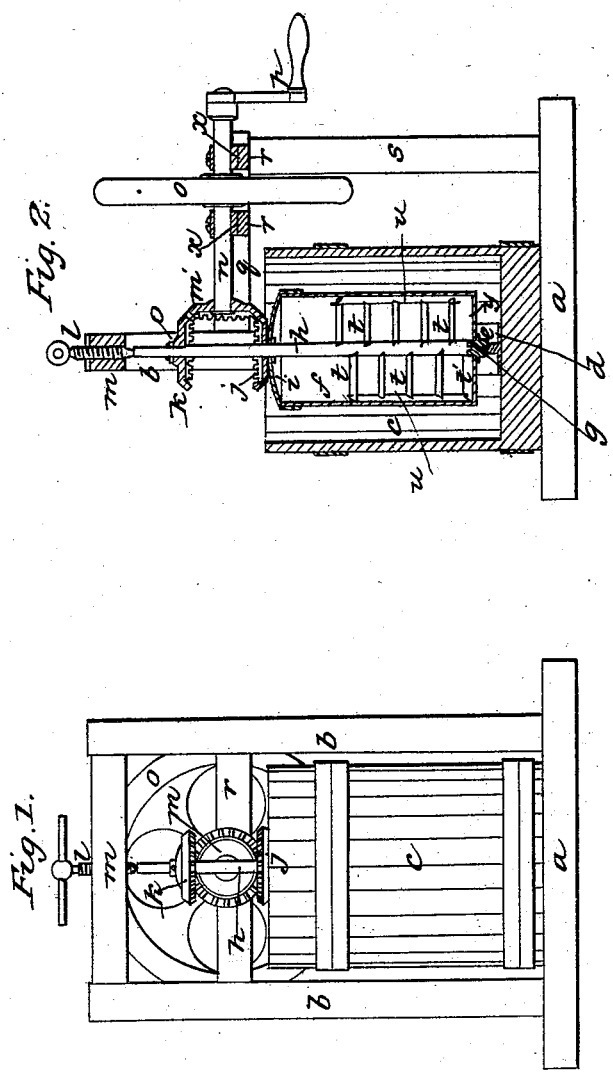

UNITED STATES PATENT OFFICE.

E. C. SEAMEN, OF PHILADELPHIA, PENNSYLVANIA.

CREAM-FREEZER.

Specification forming part of Letters Patent No. 5,821, dated October 3, 1848; Reissued November 30, 1852, No. 226.

*To all whom it may concern:*

Be it known that I, EBER C. SEAMEN, of the city and county of Philadelphia and State of Pennsylvania, have invented certain new and useful Improvements in Apparatus for Freezing Cream; and I do hereby declare that the following is a full, clear, and exact description of the construction and operation of the same, reference being had to the annexed drawings, making a part of this specification, in which—

Figure 1 is a geometrical projection of the complete apparatus, and Fig. 2 is a vertical section of the same, showing the interior of the can with the improvements claimed.

On a platform $a$, between two posts $b$, the tub $c$ is placed. Centrally on the bottom of said tub is fastened a step or gudgeon $d$, on which a corresponding gudgeon or gudgeon-box $e$, fastened to the underside of the cam $f$, sets. On the bottom $y$ of the can $f$, in its center, there is another step $g$, which receives the lower extremity of the vertical shaft $h$. This shaft passes through the lid $i$ of the can, and through the center of a bevel cog-wheel $j$, fastened to the top of said lid. A short distance above the cog-wheel $j$, there is another similar one $k$, and the extremity of the shaft, above it, is held in its place by means of a screw $l$, which passes vertically through the cross piece $m$ connecting the posts $b$, and its conical point entering a corresponding cavity in the upper end of said shaft. Back of this shaft is a third, but vertical, bevel cog-wheel $m'$, the cogs of which mesh in those of both the other wheels. This last-named cog-wheel is fastened to a horizontal shaft $n$ which extends backward and rests or works in metal boxes $x$. On said shaft is a fly or balance wheel $o$, and on its back extremity is a crank and handle $p$. The whole is fixed in an appropriate frame work $q$, $r$, and $s$.

It will readily be perceived that, in consequence of the (well-known) manner of gearing, the can will revolve in one direction, while the shaft $h$ with its appendages, inside of said can, rotates in an opposite one. The appendages just now mentioned, and which constitute the distinguishing features of the improvements claimed, consist in a series of horizontal dashers $t$, which are placed equidistant over each other, on alternate sides of the shaft $h$, into which one end of each of them is fastened, excepting the lowest one $t'$, which is wider than the rest, and the tenon or gudgeon of which plays freely in its corresponding perforation in the shaft. The permanent dashers are in shape similar to the blade of a knife, and they are placed on the shaft in such a manner, that if the surface lines were continued gradually around the shaft and thus connected together, a perfect spiral line would be the result. Each upper and lower dasher has at or near its outer extremity a perforation or hole, in which the upper and lower gudgeon of a vertical scraper $u$ plays. These scrapers are also similar to knife or sword-blades, and serve to detach or scrape off the frozen or freezing cream from the surface of the can, the general bulk of the cream forcing their edges close to the can, in consequence of the shaft, with the dashers and scrapers, revolving in an opposite direction to the can. What the scrapers $u$ do for the inner vertical surface of the can, the lowest dasher (or scraper) $t$ effects for the bottom surface; the other dashers serve to raise the cream, which, when up to its utmost height, descends again by its own gravity, and thus a continual displacing of the cream is effected, and thereby the process of freezing accelerated.

What I claim as my invention, and desire to secure by Letters Patent, is—

The side scrapers $u$, the bottom scraper $t'$, and in combination therewith the dashers $t$, the whole being constructed, arranged, and operating, substantially, in the manner and for the purpose hereinabove described.

E. C. SEAMEN.

Witnesses:
FRANCIS BENNE,
CHAUNCEY BULKLEY.

[FIRST PRINTED 1913.]